May 17, 1960 N. D. NEWBY 2,937,368

MEANS FOR DETECTING MARKING AND BY-PASSING DEFECTIVE AREAS IN A MAGNETIC RECORD MEDIUM

Filed Dec. 12, 1956

INVENTOR
N. D. NEWBY
BY V. P. Priolo
ATTORNEY 2,937,368
Patented May 17, 1960

2,937,368

MEANS FOR DETECTING MARKING AND BY-PASSING DEFECTIVE AREAS IN A MAGNETIC RECORD MEDIUM

Neal D. Newby, Leonia, N.J., assignor to Bell Telephone Laboratories, Incorporated, New York, N.Y., a corporation of New York Application December 12, 1956, Serial No. 627,860

4 Claims. (Cl. 340—174)

Figure 1:
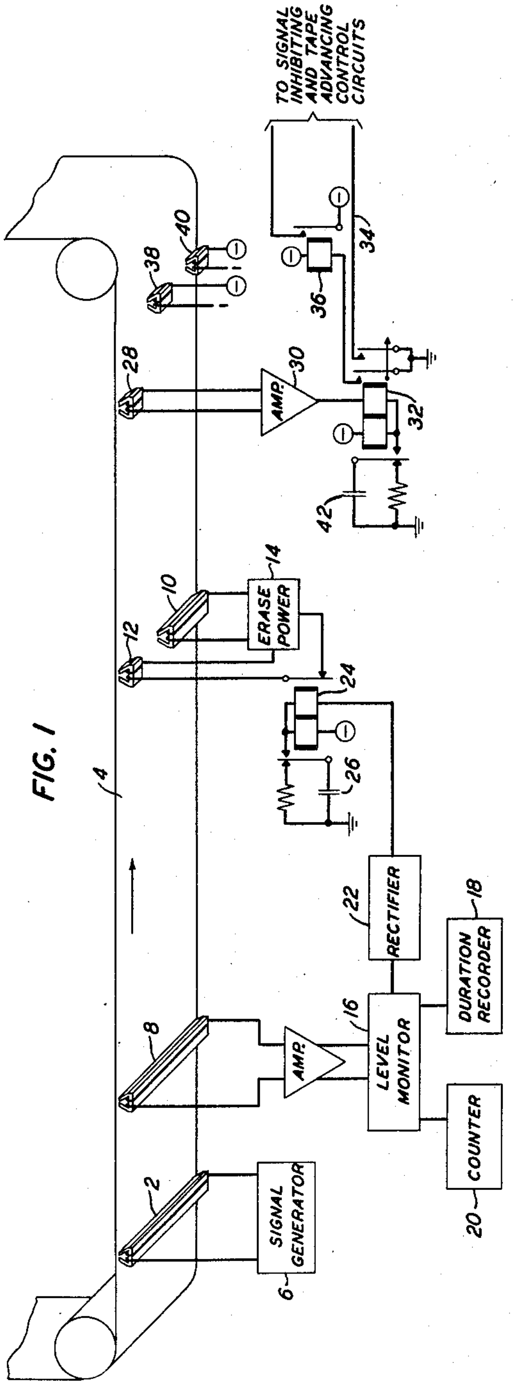

This invention relates to means for detecting, marking and by-passing defective areas in a magnetic record medium.

The use of magnetic recording in data processing machines has increased in recent years and, as a result, there has been created an increasing need for error free magnetic record tape, that is, tape free from defects which might cause recording errors. By the application of severe inspection practices it is, of course, possible to provide tape which is initially substantially defect free. However, tape of this type is much more expensive than ordinary commercial standard tape and, what is more disconcerting, cannot be guaranteed to remain defect free. Its useful life is relatively short for it will deteriorate eventually.

One method for providing some assurance against possible loss of information due to defects in standard tape is to record all data twice by using double width tape. This is, of course, an expensive and undesirable practice.

It is an object of this invention to provide means for detecting and marking defective areas in magnetic record tape so that relatively inexpensive commercial types may be used in data processing machines, and the useful service life of these tapes may be increased.

Another object of the invention is to provide means for by-passing, in magnetic record tapes which are in the process of recording data, areas which have been detected and marked as defective.

The first objective is achieved in one embodiment of the invention by an arrangement which comprises a first magnetic head which extends across the traveling tape and is energized by a constant level signal having a frequency near the upper limit of recording for the tape velocity being used, a second head which extends across the traveling tape, is disposed close to the first head and precisely aligned therewith to pick up the signal recorded by the first head and modulated by a defect in the record medium; a third head which is disposed in a manner similar to that of the first and second heads and covers the tape except for one track to erase the signal recorded by the first head; and a fourth head for erasing the track not covered by the third head. The output signal level of the second or pickup head is monitored and any variations beyond a prescribed minimum will produce a signal to control the operation of the fourth or single track erase head. Both erase heads are supplied from the same source for erasing the signal recorded by the first head. However, when the change in the signal level of the pickup head is beyond the prescribed minimum, erasing by the single track head is discontinued and the signal recorded by the first head remains on the single track to mark the defective area.

This objective is also achieved in a second embodiment of the invention by an arrangement which comprises first and second magnetic heads disposed across the traveling tape as in the first embodiment, and a third head which is disposed in such manner as to cover a single track. A direct-current signal is recorded on the tape by the first head. While the direct-current signal produces a constant flux pattern which will not generate a signal in the second or pickup head, a variation in the flux pattern produced by a defect in the tape (e.g., a hole, a foreign particle or poor magnetic coating) will look like a recorded pulse to the second head. This signal, when picked up by the second head, will energize relay means which will in turn cause alternating-current and bias signals to be fed to the third head to record a mark on the tape corresponding to the defect signal picked up by the second head.

When using the marked tape for recording in a data processing machine the marked track will control means for advancing the tape in the machine and inhibiting the signal source until the defective areas have been by-passed.

Figure 2:
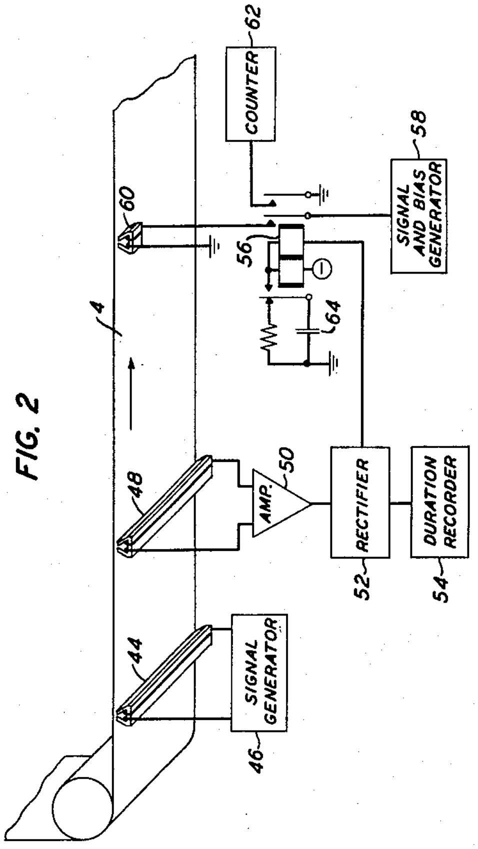

The nature of the invention and its distinguishing features and advantages will be more clearly understood from the following detailed description and the accompanying drawings in which:

Fig. 1 is a diagram of the detecting, marking and by-passing arrangement comprising one embodiment of the detecting and marking means; and Fig. 2 is a diagram of another embodiment of the detecting and marking means.

Referring now to Fig. 1 of the accompanying drawing, magnetic head 2 extends across magnetic record tape 4, traveling in the direction shown, and is disposed in such manner as to record thereon a signal from generator 6. This signal is a constant level signal having a frequency near the upper limit of recording for the velocity of tape 4. Magnetic head 8 is disposed relatively close to head 2 and is aligned therewith to pick-up the signal recorded by head 2. Magnetic heads 10 and 12 are erasing heads and each is energized by power from the same source 14. The erasing signal may be an alternating-current or direct-current signal, as desired. Erasing head 10 covers all of tape 4 except for one track. This track is covered by erasing head 12.

The output signal level of magnetic head 8 is monitored and any variations beyond a prescribed minimum will produce a signal in each of three outputs. One output of level monitor 16 is directed to the recorder 18 to record the duration of a level change, a second output operates the counter 20 to record the number of level changes and a third output is used to control the energization of erase head 12. The third output is fed through rectifier 22 to relay 24. When the variation in the level of the signal reproduced by head 8 reaches a specified magnitude, relay 24 will be energized and erase power will be cut off from erase head 12. The signal recorded by head 2 will remain in the track covered by head 12 to mark the defective area in the tape. Timing introduced by suitable means, such as capacitor 26, will extend the interval during which erase head 12 is de-energized sufficiently to bracket the defective area in the tape. The tape may then be run in either direction during recording and the defect signal used to block recording.

When the marked tape is used in a data processing machine an arrangement such as the one shown in Fig. 1 may be used to by-pass the defective areas and block recording on the tape. This arrangement comprises pickup head 28 disposed in such manner as to cover the single track marked by erase head 12. The signal marking the bracketed defective area will be picked up by magnetic head 28 and fed through amplifier 30 to energize relay 32. The operation of relay 32 will supply a stop signal over conductor 34 to means for inhibiting the production of signals in the data processing machine.

In data processing machines, such as those used in automatic telephone message accouning systems, the signal source generates simultaneous groups of signals which are recorded on the record tape. After the signals have been recorded the machine is pulsed to advance the record tape one step. Therefore, when the signal source is inhibited the record tape will not advance. In order to by-pass the defective area in the tape while the production of signals is inhibited, the tape must be advanced by means other than the pulse responsive means in the machine. Step-by-step advancement of the tape may be provided by means such as a ratchet drive controlled by relay 36 which is energized by relay 32.

In order to assure complete by-passing of the defective area, pickup head 28 may be disposed in such manner as to precede the recording heads 38 and 40 and the interval during which it is required that relay 32 remain energized after the marked track has passed head 28 may be provided by suitable timing means such as capacitor 42. It will be understood that although Fig. 1 shows the detecting, marking and by-passing steps as elements of a continuous process, the detection of defects and the marking of tape 4 may be done at a location remote from the site housing the data processing machine and the defective area by-passing facilities.

In the embodiment shown in Fig. 2, magnetic head 44 extends across magnetic record tape 4, traveling in the direction indicated, and is disposed in such manner as to record thereon a direct-current signal from generator 46. This direct-current signal will produce a constant flux pattern which will not generate a signal in pickup head 48 unless a variation in the flux pattern is introduced by a defect in the record surface. A variation in the flux pattern produced by a hole, foreign particle or other defect, will generate a signal which may be picked up by head 48. This signal will be fed through amplifier 50 and rectifier 52 to the recorder 54, to record its duration, and to relay 56. On operating, relay 56 will connect the alternating-current and bias signal generator 58 to marking head 60. Head 60 will record a signal or mark on tape 4 corresponding to the defect signal picked up by head 48. Relay 56 may also operate the counter 62 to record the number of defects. As in the embodiment shown in Fig. 1, suitable timing means, such as capacitor 64, may be used to extend the defect signal interval sufficiently to bracket the defective area in the tape.

The defective areas marked in accordance with the arrangement shown in Fig. 2 may be by-passed by the means described above in connection with the detecting and marking arrangement shown in Fig. 1.

It is to be understood that the above-described arrangements are illustrative of the application of the principles of the invention. Other arrangements may be devised by those skilled in the art without departing from the spirit and scope of the invention.

What is claimed is:

1. Means for detecting and marking a defective area in a traveling magnetic record tape comprising a signal source, a first electromagnetic translating head disposed in such manner with respect to the recording surface of said tape as to record thereacross a signal from said source, a second electromagnetic translating head disposed adjacent said first electromagnetic translating head for reproducing said recorded signal, means for measuring the level of said reproduced signal, third and fourth electromagnetic translating heads disposed adjacent said second translating head for erasing said recorded signal, said third electromagnetic translating head covering all but one track of said recording surface, said fourth electromagnetic translating head covering said one track of said recording surface, said fourth electromagnetic translating head being controlled by said signal level measuring means in such manner as to become ineffective when a defect in the recording surface of said tape causes the variation in said signal level to reach a specified magnitude, and thereby permit said recorded signal to remain in said one track of said tape to mark the area within which said defect is included.

2. Means for detecting and marking a defective area in a traveling magnetic record tape comprising a signal source, a first electromagnetic translating head disposed in such manner with respect to the recording surface of said tape as to record thereacross a signal from said source, a second electromagnetic translating head disposed adjacent said first electromagnetic translating head for reproducing said recorded signal, means for measuring the level of said reproduced signal, third and fourth electromagnetic translating heads disposed adjacent said second electromagnetic translating head for erasing said recording signal, said third electromagnetic translating head covering all but one track of said recording surface, said fourth electromagnetic translating head covering said one track of said recording surface, a source of erasing power, each of said third and fourth electromagnetic translating heads being connected to said source of power, relay means for controlling the energization of said fourth electromagnetic translating head, said relay means being connected to said signal level measuring means in such manner as to become actuated when a defective area in the recording surface of said tape causes the variation in said signal level to reach a specified magnitude, said fourth electromagnetic translating head being disconnected from said source of power by said relay means and becoming ineffective when said relay means is actuated, thereby permitting said recorded signal to remain in said one track of said tape to mark said defective area.

3. Means for detecting and marking a defective area in a traveling magnetic record tape in accordance with claim 2 wherein said relay means comprises a time delay network for extending the interval of actuation of said relay beyond that determined by said signal level measuring means to include all of the defective area within the length of tape marked by said fourth electromagnetic translating head.

4. Means for by-passing a defective area in a traveling magnetic record tape disposed in a data recording machine comprising a signal source, a first magnetic head disposed in such manner with respect to the recording surface of said tape as to record thereacross a signal from said source, a second magnetic head disposed adjacent said first magnetic head for reproducing said recorded signal, means for measuring the level of said reproduced signal, third and fourth magnetic heads disposed adjacent said second magnetic head for erasing said recorded signal, said third magnetic head covering all but one track of said recording surface, said fourth magnetic head covering said one track of said recording surface, a source of erasing power, each of said third and fourth magnetic heads being connected to said source of power, relay means for controlling the energization of said fourth magnetic head, said relay means being connected to said signal level measuring means in such manner as to be actuated when a defective area in the recording surface of said tape causes the variation in said signal level to reach a specified magnitude, said fourth magnetic head being disconnected from said source of power by said relay means and becoming ineffective when said relay means is actuated, thereby permitting said recorded signal to remain in said one track of said tape to mark said defective area, a fifth magnetic head for reproducing said marking signal, electromagnetic means responsive to said reproduced signal for advancing said marked area of said tape beyond the influence of the data recording means in said machine and for inhibiting the production of data signals in said machine for the duration of said tape advance.

References Cited in the file of this patent

UNITED STATES PATENTS

| | | |
|---|---|---|
| 2,793,344 | Reynolds | May 21, 1957 |
| 2,816,162 | Johnson | Dec. 10, 1957 |
| 2,817,829 | Lubkin | Dec. 24, 1957 |